(12) United States Patent
Prabhu et al.

(10) Patent No.: US 8,908,341 B2
(45) Date of Patent: Dec. 9, 2014

(54) POWER CLAMP FOR HIGH VOLTAGE INTEGRATED CIRCUITS

(75) Inventors: Manjunatha Prabhu, Singapore (SG); Mahadeva Iyer Natarajan, Clifton Park, NY (US); Da-Wei Lai, Singapore (SG); Shan Ryan, Singapore (SG)

(73) Assignee: GLOBALFOUNDRIES Singapore Pte. Ltd., Singapore (SG)

( * ) Notice: Subject to any disclaimer, the term of this patent is extended or adjusted under 35 U.S.C. 154(b) by 82 days.

(21) Appl. No.: 13/439,426

(22) Filed: Apr. 4, 2012

(65) Prior Publication Data

US 2013/0265676 A1  Oct. 10, 2013

(51) Int. Cl.
*H02H 9/00* (2006.01)
*H02H 9/04* (2006.01)
*H02H 3/20* (2006.01)
*H02H 3/22* (2006.01)

(52) U.S. Cl.
USPC .............................. 361/56; 361/91.1; 361/111

(58) Field of Classification Search
USPC .......................................... 361/56, 91.1, 111
See application file for complete search history.

(56) References Cited

U.S. PATENT DOCUMENTS

| | | | |
|---|---|---|---|
| 5,959,820 A * | 9/1999 | Ker et al. | 361/111 |
| 6,566,715 B1 * | 5/2003 | Ker et al. | 257/355 |
| 6,747,861 B2 * | 6/2004 | Ker et al. | 361/111 |
| 7,203,045 B2 | 4/2007 | Chatty et al. | |
| 7,215,146 B2 * | 5/2007 | Khan | 326/83 |
| 7,242,561 B2 * | 7/2007 | Ker et al. | 361/56 |
| 7,283,342 B1 * | 10/2007 | Ker et al. | 361/56 |
| 7,446,607 B2 * | 11/2008 | Jung et al. | 330/253 |
| 7,656,627 B2 * | 2/2010 | Ker et al. | 361/56 |
| 8,238,067 B2 * | 8/2012 | Drapkin et al. | 361/56 |
| 2003/0076636 A1 * | 4/2003 | Ker et al. | 361/56 |
| 2008/0106834 A1 * | 5/2008 | Hung | 361/56 |
| 2009/0021872 A1 * | 1/2009 | Ker et al. | 361/56 |
| 2010/0244187 A1 * | 9/2010 | Voldman | 257/531 |
| 2010/0277841 A1 * | 11/2010 | Riviere et al. | 361/56 |

* cited by examiner

*Primary Examiner* — Rexford Barnie
*Assistant Examiner* — Christopher Clark
(74) *Attorney, Agent, or Firm* — Ditthavong & Steiner, P.C.

(57) ABSTRACT

A clamp circuit includes both nmos and pmos devices connected in series between a voltage source terminal, such as an integrated circuit pad, and ground. A trigger unit, connected between the voltage source and ground, includes a plurality of output terminals coupled to the clamp circuit. The trigger unit is responsive to a voltage threshold, such as caused by an ESD occurrence, between the voltage source and ground to apply clamping signals at its output terminals to couple the voltage source terminal to ground through both nmos and pmos devices.

6 Claims, 3 Drawing Sheets

POWER CLAMP FOR HIGH VOLTAGE INTEGRATED CIRCUITS

BACKGROUND

This disclosure relates to high voltage clamps for integrated circuits. The need for protection against electrostatic discharge (ESD) exists, for example, in applications including programming pads. Such applications may involve One Time Programmable (OTP) memories used in RFID, video game consoles, mobile phones, and the like.

Design of high voltage tolerant ESD clamps using nominal devices can be quite challenging. During programming mode, the use of simple ESD clamps using nominal devices often present reliability issues such as gate oxide stress, drain/well voltage overstress, etc. A commonly used technique to overcome such problems is by stacking nmos FETs in a clamping device. An example of such technique is disclosed in U.S. Pat. No. 7,203,045. Multilevel stacking of nmos elements, however, reduces clamping efficiency with each added level. Reliability concerns exist with respect to drain junction voltages and gate oxide breakdown, as well as the possibility of leakage currents during normal functioning modes.

A high voltage tolerant clamp is needed that uses nominal devices, yet avoids reliability stress that can occur due to a high voltage application. Such clamp should be optimized to reduce area and current leakage.

DISCLOSURE

The needs described above are fulfilled, at least in part, by a pmos nmos series clamp based circuit connected between a voltage source terminal, such as an integrated circuit pad, and ground. The inverter based circuit contains both nmos and pmos devices connected in series. A trigger unit connected between the voltage source and ground includes a plurality of output terminals coupled to the inverter based circuit. The trigger unit is responsive to a voltage threshold, such as caused by an ESD occurrence, between the voltage source and ground to apply clamping signals at its output terminals to couple the voltage source terminal to ground through both nmos and pmos devices.

The trigger unit may include a resistive-capacitive timing circuit. First and second circuit branches may have capacitive and resistive elements connected between the voltage source terminal and ground. Junctions between a capacitive element and a resistive element in each circuit branch may be connected to respective inputs of the nmos and pmos devices. An ESD voltage event is detected by the trigger unit and, in response thereto, the series connected nmos and pmos devices are activated. Application of clamping signals to the nmos and pmos devices is applied by the resistive-capacitive timing circuitry. A plurality of capacitive elements may be provided in each circuit branch, the extent of delay being dependent thereon.

The trigger circuit, upon sensing termination of the ESD voltage occurrence, deactivates the series connected nmos and pmos devices, to restore normal functionality to the circuit application. Such deactivation may be delayed by latching the clamping signals. For this purpose, the first and second latch circuits may include respective back-to-back inverters.

The trigger unit alternatively may include a resistor divider circuit. A plurality of PGATE FETs and a plurality of NGATE FETs may be connected between the voltage source terminal and ground. Gates of these devices are connected to respective resistive elements of the resistor divider circuit. A double guard ring may be formed for adjacent series connected like FET elements.

Additional advantages of the present disclosure will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

Various exemplary embodiments are illustrated by way of example, and not by way of limitation, in the figures of the accompanying drawings in which like reference numerals refer to similar elements and in which.

DETAILED DESCRIPTION

Figure 1:
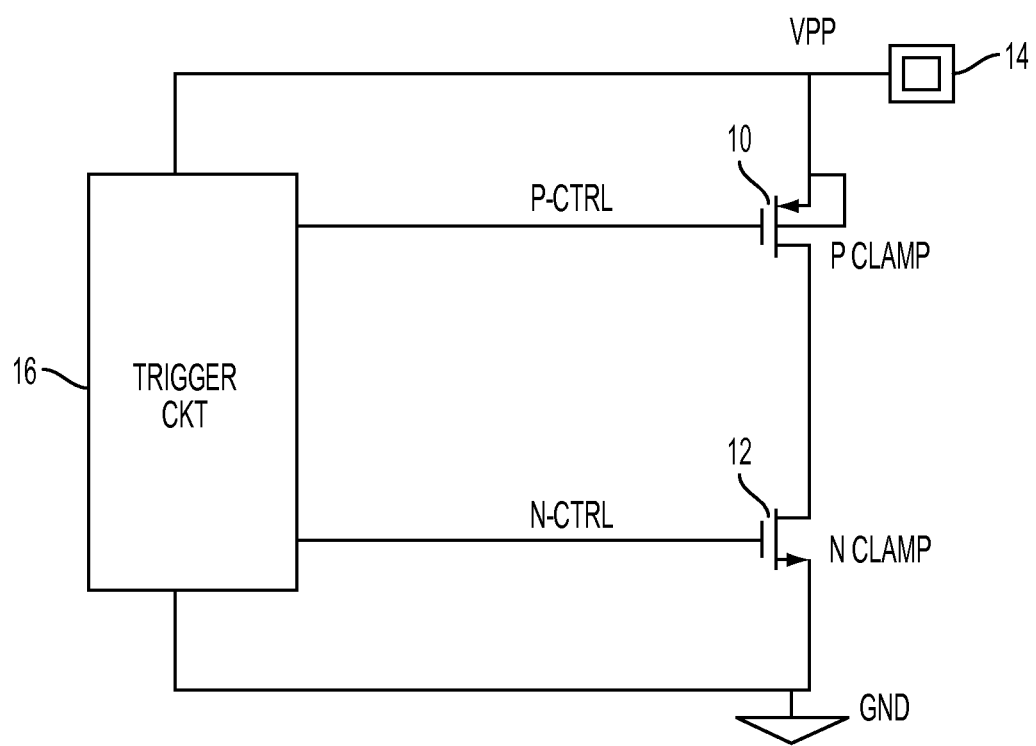
FIG. 1 is a block diagram of a PMOS/NMOS power clamp of the present disclosure.

A PMOS/NMOS power clamp of the present disclosure is depicted in block diagram form in FIG. 1. P-Clamp 10 and N-Clamp 12 are ESD clamping devices connected in series between a voltage source pad 14 and ground. During normal pad operation, such as OTP memory programming, the gate of N-Clamp 12 is driven to a logic low and the gate of P-Clamp 10 is driven to a logic high. As both devices are driven off, there will be no oxide stress, no oxide/junction stress, and no leakage current. After an ESD event is detected by the trigger unit, clamping devices 10 and 12 will be driven on by clamping signals generated by trigger unit 16 to sink the current to ground. A logic low signal will be applied to P-Clamp 10 and a logic high signal will be applied to N-Clamp 12.

Buffering by the trigger unit is desirable to stabilize the clamping signals to avoid any mis-triggering of the clamping devices. One implementation for providing appropriate buffering is exemplified by the circuit diagram of FIG. 2. P-Clamp 10 and N-Clamp 12 are under control of separate buffering and RC timer circuit branches. Capacitors are realized using a plurality of nmos devices (MNC1, MNC2 . . . MNCn) and a plurality of pmos devices (MPC1, MPC2 . . . PMCn) to avoid any voltage over stress issue for the gate dielectrics. Capacitors MPC1, MPC2, MPCn, and resistor R1, connected in series between terminal 14 and ground, form an N-RC timer. Similarly, capacitors MNC1, MNC2 . . . MNCn, and resistor R2, connected in series between terminal 14 and ground, form an P-RC timer. Node 20, the resistor capacitor junction, is connected to the gate of N-Clamp 12. Node 22, the resistor capacitor junction, is connected to the gate of the P-Clamp 10.

During normal operation, or programming mode, all capacitor elements are fully charged. Node 20, connected to the NGATE of MN1 12 will be at a logic low, and node 22, connected the PGATE of MP1 10, will be at a logic high. This will keep both MP1 and MN1 transistors off. The gate, source and bulk of PMOS MP1 will be at a logic high, while the gate, source and bulk of NMOS MN1 will be at a logic low. Node np 24 will be left floating. This will avoid any possible over stress on the devices. During an ESD event, capacitors will be electrically shorted. This will drive node 20 to a logic high, and node 22 to a logic low. This will keep both clamping devices MP1 and MN1 on during the ESD event.

Figure 3:
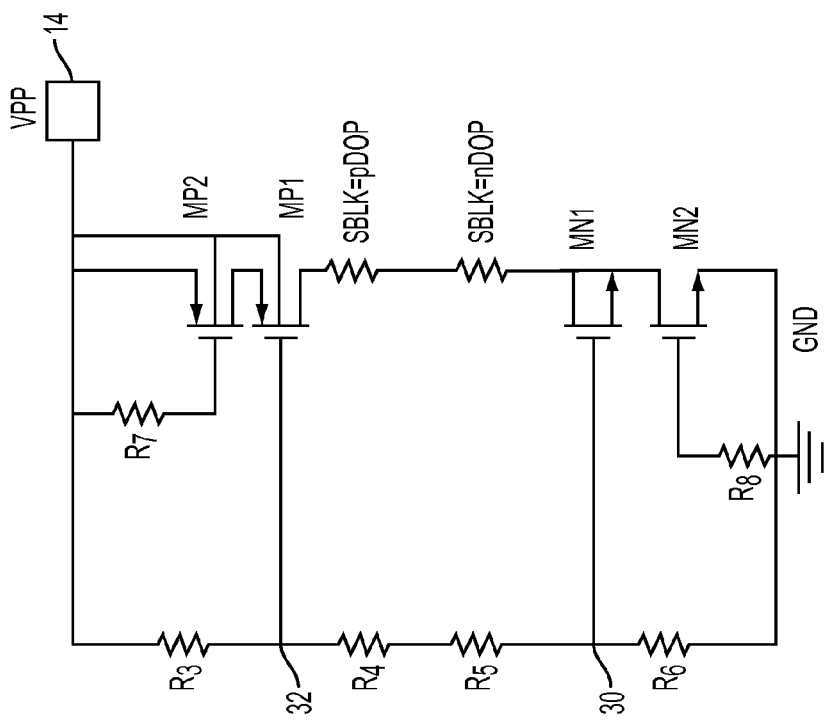
FIG. 3 is a circuit diagram of another implementation for the power clamp of FIG. 1.

An alternative implementation is exemplified by the resistor divider based circuit shown in FIG. 3. P-Clamps MP1 and MP2 and N-Clamps MN1 and MN2 are connected between in series between voltage source pad 14 and ground. A plurality of four resistor elements R3 is connected between pad 14 and ground. Node 30, the junction between R5 and R6, is connected to the gate of MN1. Node 32, the junction between R3 and R4, is connected to the gate of MP1. Resistor R7 is connected between pad and the gate of MP2. Resistor R8 is connected between the gate of MN2 and ground. Resistors R3-R6 may be of substantially equal value, for example, 2.0 Meg. Resistors R7 and R8 may be of substantially equal lesser value, for example, 50K. Bulk resistance SBLK may be about 1.5 um, and on the order of a few Ohms.

The illustrated circuit of FIG. 3 provides a double guard ring around the pmos and nmos elements. The circuit is formed in a relatively reduced area of the integrated circuit. In operation, the circuit will perform in accordance with the description of FIG. 1. During normal pad operation, the gates of MN1 and MN2 are driven to a logic low and the gates of MP1 and MP2 are driven to a logic high. As these devices are driven off, there will be no oxide stress, no oxide/junction stress, and no leakage current. An ESD event is detected from the high voltage applied to pad 14, to drive clamping devices MN1, MN2, MP1 and MP2, to sink the current to ground. Logic low signals will be applied to the gates of MP1 and MP2 and logic high signals will be applied to the gates of MN1 and MN2.

Figure 2:
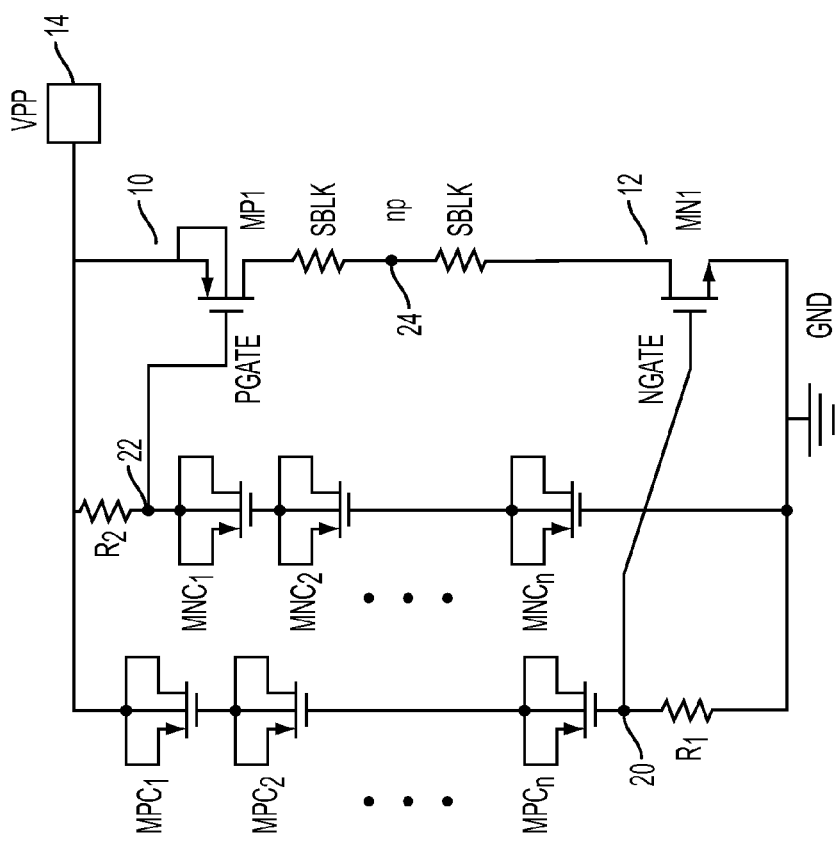
FIG. 2 is a circuit diagram of one implementation for the power clamp of FIG. 1.
Figure 4:
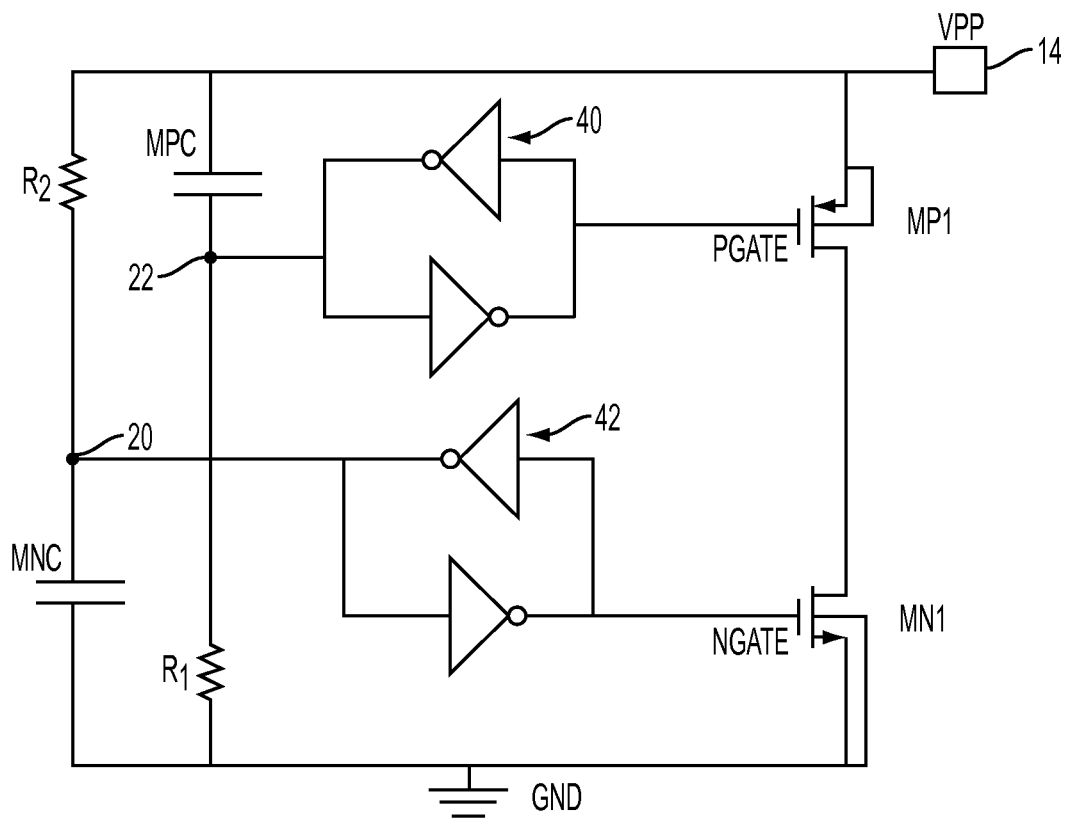
FIG. 4 is an exemplary circuit diagram modification for the implementation of FIG. 2.

The circuit shown in FIG. 4 exemplifies a modification for the circuit of FIG. 2. As in the circuit of FIG. 1, MP1 and MN1 are connected in series between voltage pad 14 and ground. Capacitor MPC and resistor R1 are connected in a series circuit branch between pad 14 and ground. Node 22, the junction between MPC and R1, is coupled to the gate of MP1 via latch 40. Latch 40 includes back-to-back inverters. MP1 and MN1 are connected in series between voltage pad 14 and ground. Capacitor MNC and resistor R2 are connected in a series circuit branch between pad 14 and ground. Node 20, the junction between MNC and R12 is coupled to the gate of MN1 via latch 42. Latch 42 includes back-to-back inverters. Each of the circuit branches corresponds to a respective circuit branch of the diagram of FIG. 2. Latches 41 and 42 form weak buffers that delay switching off the clamping devices MP1 and MN1 following an ESD event.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, the latch circuits illustrated in FIG. 4 may be utilized in conjunction with the resistor divider circuit of FIG. 3. The relative values of the elements described with respect to FIG. 3 are merely exemplary and may be adjusted in accordance with expected application.

What is claimed is:
1. A device comprising:
    a circuit comprising an nMOS device and a pMOS device connected in series between a voltage source terminal and ground; and
    a trigger unit connected between the voltage source and ground, the trigger unit comprising a plurality of output terminals coupled to respective gates of the nMOS device and pMOS device, the trigger unit responsive to a voltage threshold between the voltage source and ground to apply clamping signals at the output terminals, wherein the voltage source terminal is coupled to ground through the nMOS device and pMOS device;
    wherein the trigger unit comprises a timing circuit coupled to the voltage source terminal and ground, the timing circuit comprising:
    a first circuit branch having first capacitive and resistive elements connected between the voltage source terminal and ground, a junction between a first capacitive element and first resistive element connected to the gate of the nMOS device; and
    a second circuit branch having second capacitive and resistive elements connected between the voltage source terminal and ground, a junction between a second capacitive element and second resistive element connected to the gate of the pMOS device; and
    wherein the trigger unit further comprises:
    a first latch circuit directly connected between the junction of the first circuit branch and the gate of the nMOS device; and
    a second latch circuit directly connected between the junction of the second circuit branch and the gate of the pMOS device.
2. A device as recited in claim 1, wherein the first and second latch circuits comprise respective back-to-back inverters.
3. A device comprising:
    a circuit comprising an nMOS device and a pMOS device connected in series between a voltage source terminal and ground; and
    a trigger unit connected between the voltage source and ground, the trigger unit comprising a plurality of output terminals coupled to respective gates of the nMOS device and pMOS device, the trigger unit responsive to a voltage threshold between the voltage source and ground to apply clamping signals at the output terminals, wherein the voltage source terminal is coupled to ground through the nMOS device and pMOS device;
    wherein the trigger unit comprises a resistor divider circuit comprising a plurality of serially connected resistor elements; and
    a first junction between adjacent resistor elements is directly connected to the gate of the nMOS device and a second junction between adjacent resistor elements is directly connected to the gate of the pMOS device.
4. A device as recited in claim 3, wherein the pMOS device comprises a plurality of PGATE FETs and the nMOS device comprises a plurality of NGATE FETs connected to respective resistive elements of the resistor divider circuit.
5. A device as recited in claim 4, wherein a double guard ring is configured around the pMOS and nMOS elements.
6. A device as recited in claim 3, wherein the voltage threshold corresponds to an electrostatic discharge (ESD) occurrence.

* * * * *